United States Patent [19]

Suzuki et al.

[11] 4,403,584
[45] Sep. 13, 1983

[54] METHOD AND APPARATUS FOR OPTIMUM CONTROL FOR INTERNAL COMBUSTION ENGINES

[75] Inventors: Atsushi Suzuki; Masakazu Ninomiya, both of Kariya, Japan

[73] Assignee: Nippondenso Co., Ltd., Kariya, Japan

[21] Appl. No.: 298,613

[22] Filed: Sep. 2, 1981

[30] Foreign Application Priority Data

Sep. 5, 1980 [JP] Japan .................................. 55-123817

[51] Int. Cl.³ ............................................. F02D 37/02
[52] U.S. Cl. .................................... 123/417; 123/418; 123/480; 123/585; 364/431.05
[58] Field of Search ............... 123/416, 417, 418, 419, 123/436, 438, 480, 486, 585; 364/431.05, 431.08, 431.04

[56] References Cited

U.S. PATENT DOCUMENTS

| | | | |
|---|---|---|---|
| 3,142,967 | 8/1964 | Schweitzer | 60/105 |
| 4,026,251 | 5/1977 | Schweitzer et al. | 123/419 |
| 4,064,846 | 12/1977 | Latsch et al. | 123/419 |
| 4,191,146 | 3/1980 | Taplin | 123/418 |
| 4,197,767 | 4/1980 | Leung | 123/436 |
| 4,286,560 | 9/1981 | Sagisaka et al. | 123/416 |
| 4,322,800 | 3/1982 | Hisegawa et al. | 123/417 |

Primary Examiner—Charles J. Myhre
Assistant Examiner—Andrew M. Dolinar
Attorney, Agent, or Firm—Cushman, Darby & Cushman

[57] ABSTRACT

A method and apparatus for optimum control for internal combustion engines employ computing means with memory means in which the values indicative of ignition timings and air-fuel ratios of an engine are preliminarily stored in the form of maps in accordance with parameters indicative of the operating conditions of the engine. At least one cycle of ignition timing optimization processing and at least one cycle of air-fuel ratio optimization processing are performed alternately so as to control the engine at the optimum ignition timing and air-fuel ratio for minimum fuel consumption.

8 Claims, 12 Drawing Figures

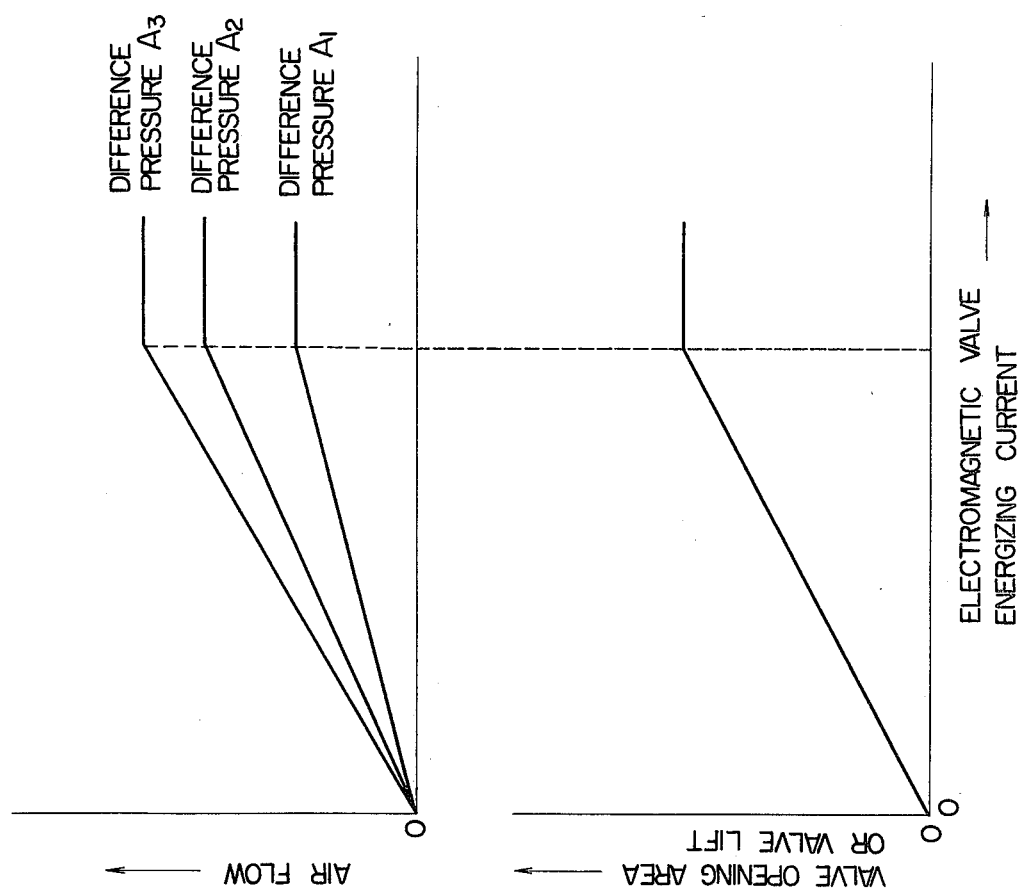
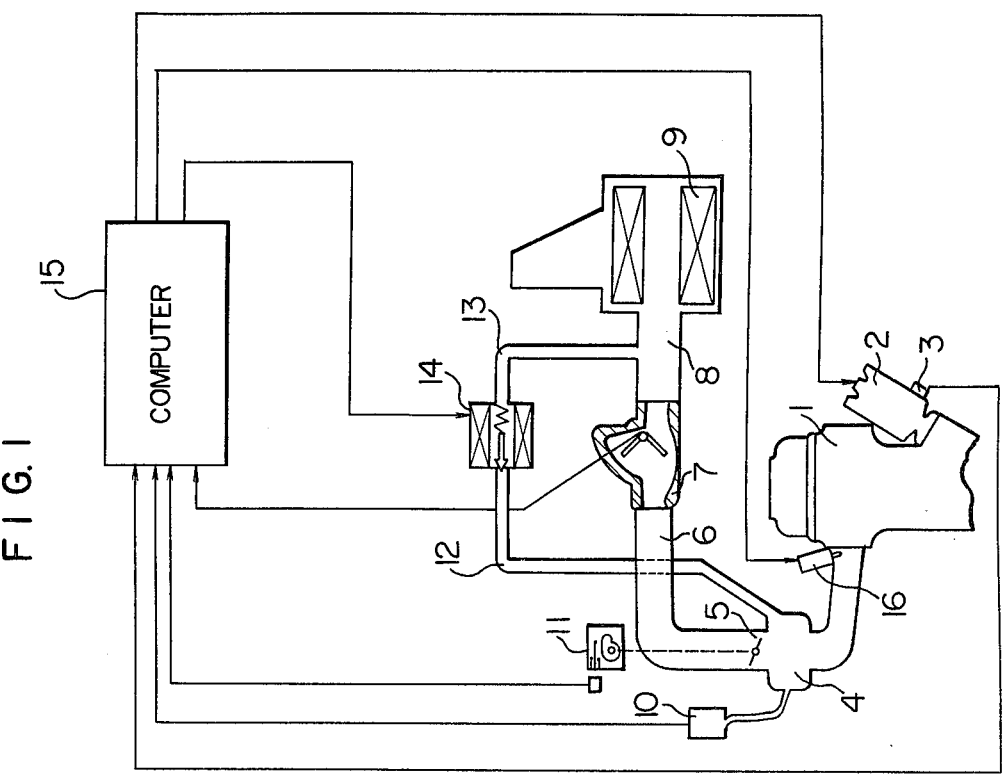

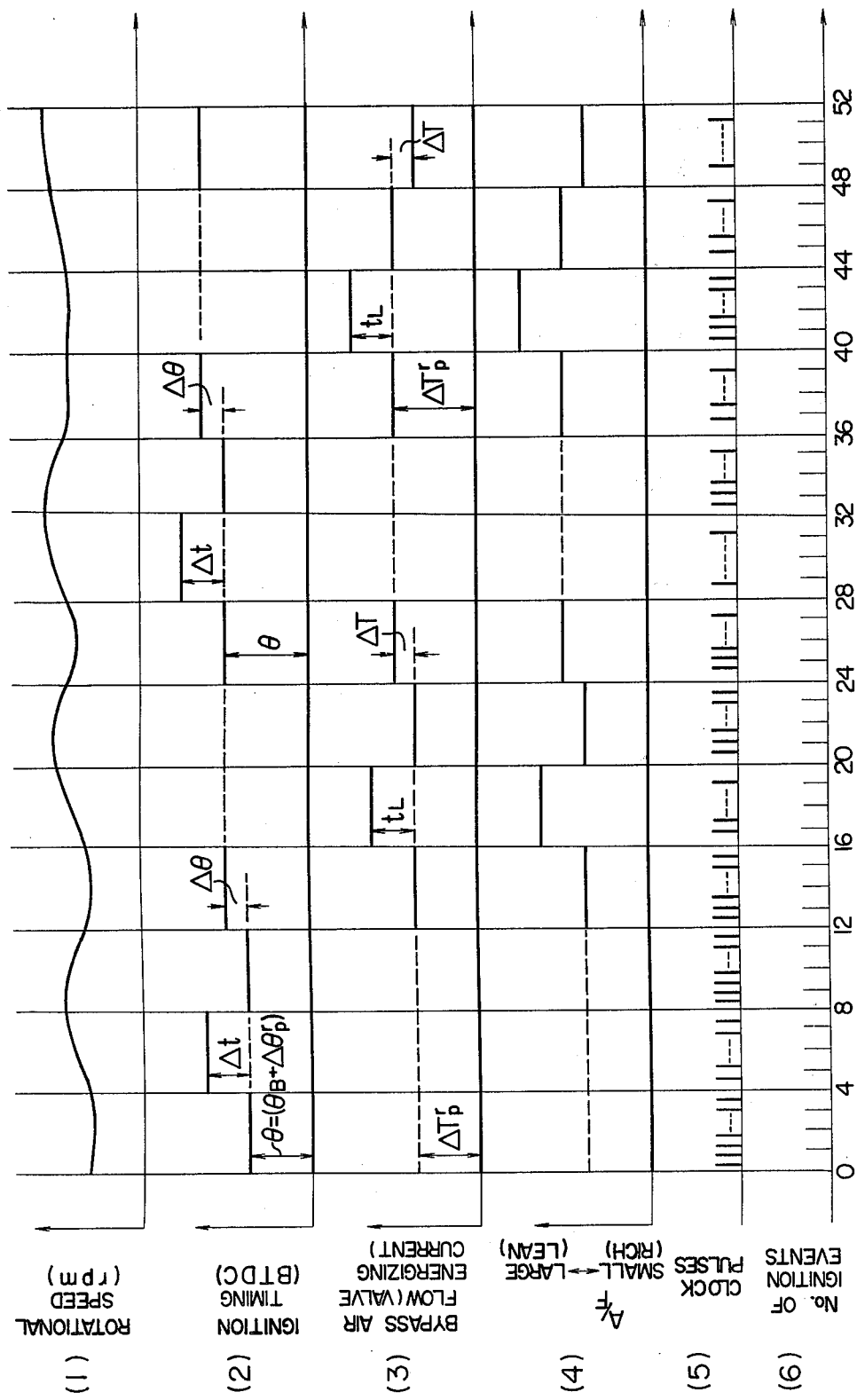

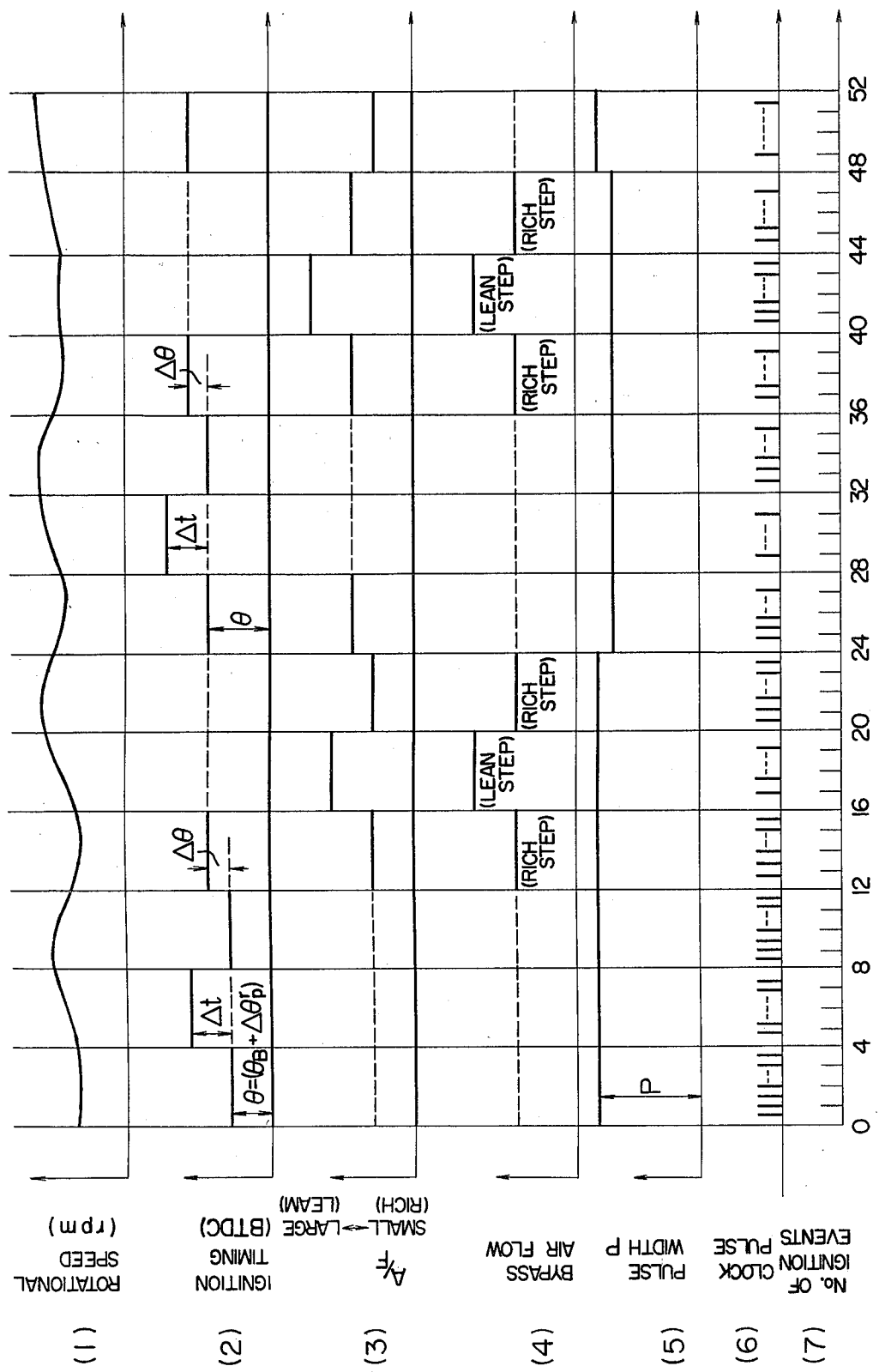

METHOD AND APPARATUS FOR OPTIMUM CONTROL FOR INTERNAL COMBUSTION ENGINES

BACKGROUND OF THE INVENTION

1. Field of the Invention

The present invention relates to a method and apparatus for feedback controlling the ignition timing and the air-fuel ratio in internal combustion engines to minimize the fuel consumption rate.

2. Description of the Prior Art

Conventionally, unless specific characteristics such as knocking, exhaust emission characteristic, etc. are to be controlled, the ignition timing of an internal combustion engine is controlled in accordance with the operating conditions of the engine in response to the engine speed and intake pipe pressure such that a maximum possible power output of the engine is ensured and also fuel consumption is reduced to a minimum value. However, with previously known methods of this type, it is difficult to always ensure a high degree of control accuracy due to the variations in characteristics among different engines, the variations in environmental conditions or the like. As a result, some degree of loss of power output and fuel consumption are unavoidable.

As regards the air-fuel ratio of mixtures supplied to the engine, under ordinary running conditions, the air-fuel ratio is set to the stoichiometric air-fuel ratio or a leaner air-fuel ratio placing emphasis on the improvement of fuel consumption. During acceleration or while ascending a hill where the accelerator pedal angle is large, the air-fuel ratio is set to the maximum power ratio (about 13:1), and during idling the air-fuel ratio is set to optimize stability, etc. Open loop air-fuel ratio control is performed on conventional carburetors and there is a certain degree of fuel consumption loss due to variations in performance among different engines, the variations over time of engines, variations in performance among the carburetors themselves caused during their manufacture, etc. Closed loop control designed to correct the fuel supply quantity by sensing the direction toward the stoichiometric air-fuel ratio (about 15:1) with an oxygen sensor disposed in the exhaust pipe is put into practical use in a known electronically controlled fuel injection system of the type in which the amount of intake air into the engine is measured by an air flow sensor or the like and the required fuel supply quantity is computed by a computer or the like, thereby injecting fuel into the intake pipe via an electromagnetic valve in accordance with the computed value. The closed loop control for readjusting the amount of air flow through an air bleed by sensing the direction toward the stoichiometric air-fuel ratio with an oxygen sensor is also put into practical use in some known carburetors. However, while closed loop control is effective in preventing variations in the air-fuel ratio, there is still unavoidable fuel consumption loss since the stoichiometric air-fuel ratio does not give the minimum fuel consumption.

A known type of control method for eliminating such a loss and ensuring the minimum fuel consumption is disclosed, for example, in the specification of U.S. Pat. No. 4,026,251. This control method is such that the air bypassing a carburetor is dithered (i.e., the air-fuel ratio is switched between the rich side and the lean side at predetermined intervals) so that the direction of correcting the air-fuel ratio to improve the fuel consumption is determined and the air-fuel ratio is adjusted by an auxiliary air valve bypassing the carburetor. In this method, the engine is operated once at each of two air-fuel ratio levels, namely, relatively rich and lean air-fuel ratios, and then a comparison is made between the rotational speed $Ne_R$ reached in the operation at the rich air-fuel ratio and the rotational speed $Ne_L$ reached in the operation at the lean air-fuel ratio to effect the following control: if $Ne_R > Ne_L$, then bypassing air is decreased; and if $Ne_R < Ne_L$, then bypassing air is increased.

However, when a change in the power output is determined in accordance with the rotational speed, since the rotational speed varies in dependence on various factors, this method is not capable of discriminating between a change of rotational speed due to a change of the air-fuel ratio and that due to any external factor (e.g., the accelerator pedal movement, ascending or descending a slope, etc.), so that there is a danger of controlling the air-fuel ratio in a direction opposite to that which improves the fuel consumption and thus deteriorating the fuel consumption.

Now, returning to the discussion to the ignition timing, methods of feedback control of ignition timing to eliminate the previously mentioned loss and ensure the maximum possible engine power are known in the prior art, as disclosed, for example, in the specification of U.S. Pat. No. 3,142,967. In accordance with this method, the engine is operated at each of two different ignition timings which are near the desired ignition timing so that the rotational speed Nr reached in the operation firstly at a retarded ignition timing and the rotational speed Na reached in the operation secondly at an advanced ignition timing are detected and compared as to the relative magnitude thereof. If $Nr < Na$, the desired ignition timing is advanced further by a predetermined value. If $Nr > Na$, the desired ignition timing is retarded by the predetermined value. By so readjusting the desired ignition timing, the ignition timing is controlled to the optimum ignition timing which provides the maximum engine torque.

However, when a change in the power output is determined in accordance with the rotational speed, for example, since the rotational speed varies due to various factors, this method is not capable of discriminating between a change of the rotational speed due to the ignition timing and that due to any external factor (e.g., the accelerator pedal movement), so that thus there is a danger such that, during acceleration or deceleration, ascending or descending a slope or the like, the ignition timing is controlled to be readjusted in a direction opposite to that which provides the maximum torque, thus decreasing the rotational speed and deteriorating the power output and the fuel consumption.

SUMMARY OF THE INVENTION

With a view to overcoming the foregoing deficiencies in the prior art, it is an object of the present invention to provide a method and apparatus for optimum controls for internal combustion engines so designed that the ignition timing optimizing control and the air-fuel ratio optimizing control of an internal combustion engine are alternately carried out and the engine is always controlled to operate at the ignition timing and air-fuel ratio with minimum fuel consumption.

BRIEF DESCRIPTION OF THE DRAWINGS

FIG. 1 is a schematic diagram showing the construction of a first embodiment apparatus for performing a method according to the present invention.

FIG. 2 is a characteristic diagram of the electromagnetic bypass air valve shown in FIG. 1.

FIG. 8 is a time chart for explaining the operation of the apparatus shown in FIG. 1.

FIG. 11 is a time chart for explaining the operation of a second embodiment apparatus for performing the method according to the invention.

In the drawings, like reference numerals refer to like parts or items.

DESCRIPTION OF THE PREFERRED EMBODIMENTS

Figure 3:
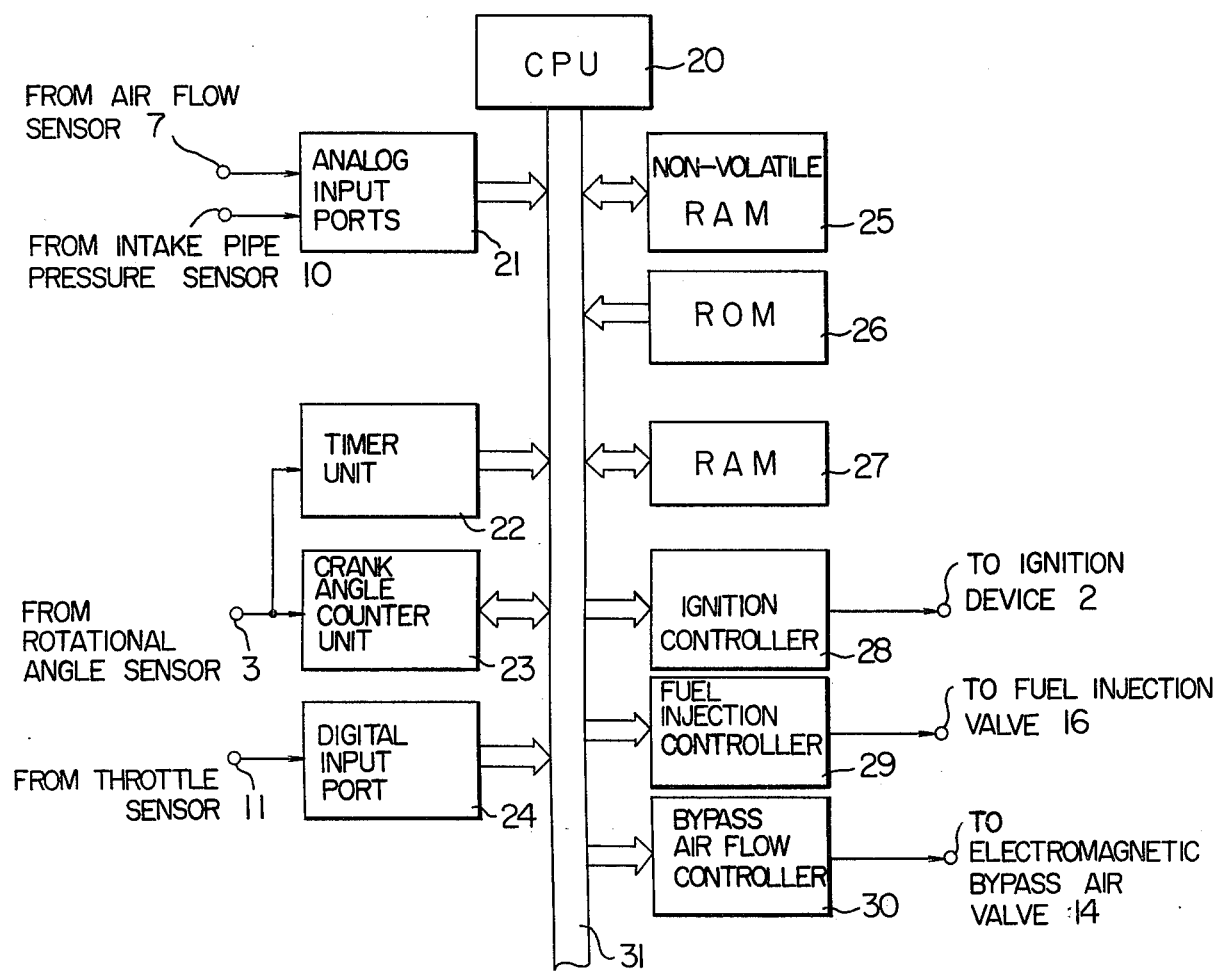
FIG. 3 is a detailed block diagram of the computer shown in FIG. 1.
Figure 4:
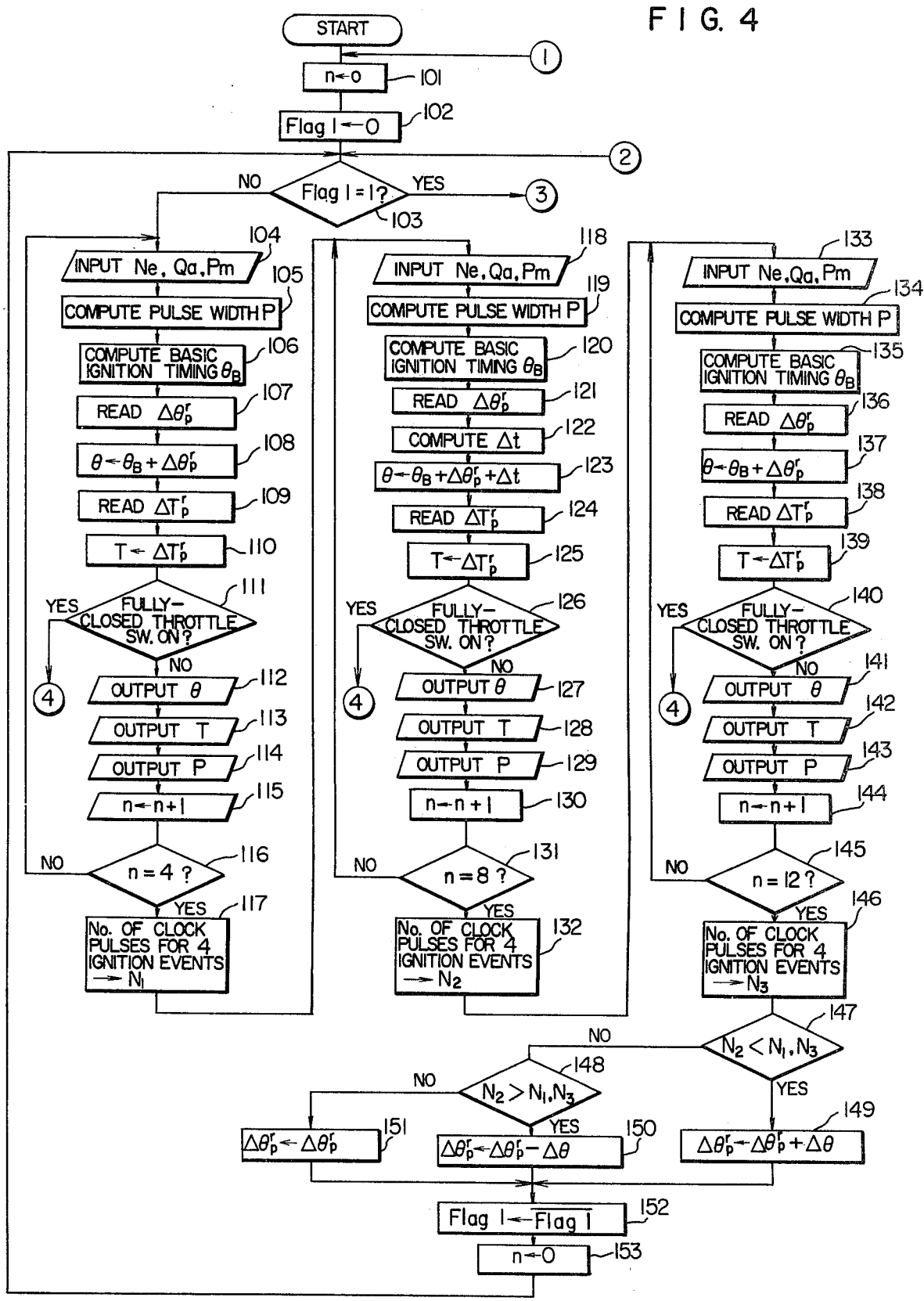
FIGS. 4 to 7 are flow charts showing the processing procedures of the computer shown in FIG. 1.
Figure 5:
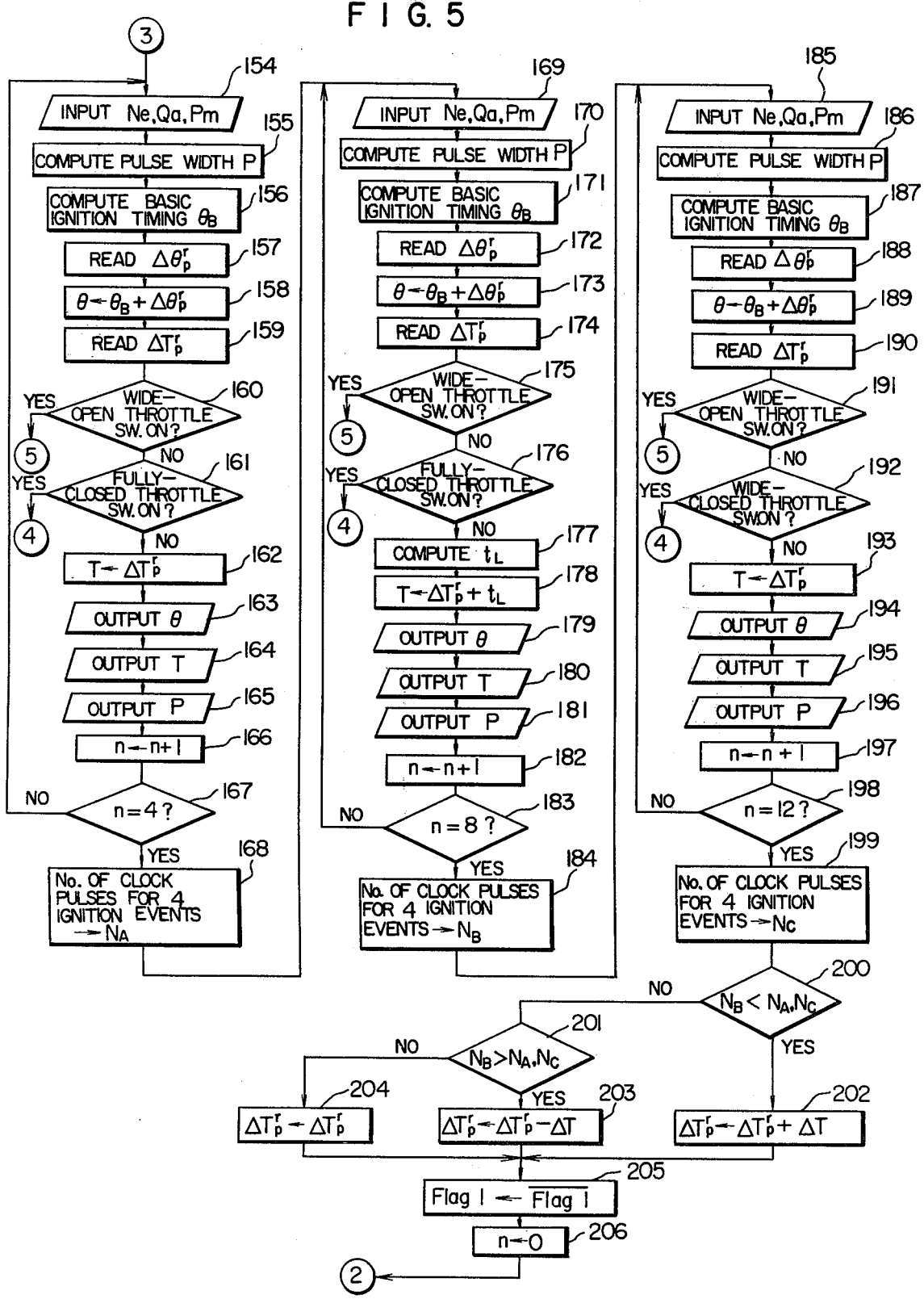
Figure 6:
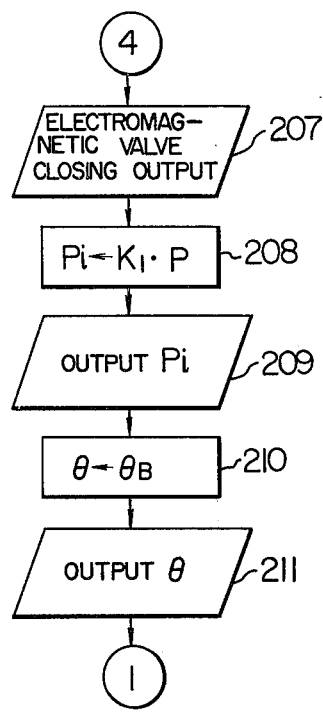
Figure 7:
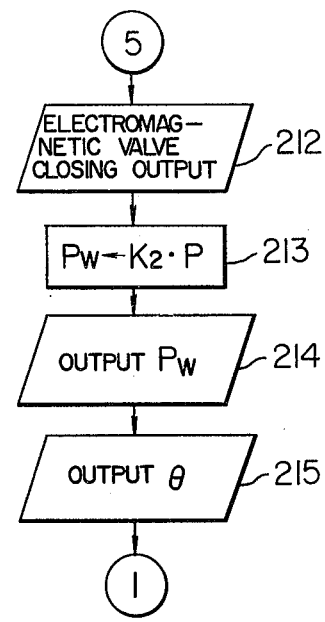

The method according to the present invention will now be described in greater detail with reference to the illustrated embodiments.

Referring to FIG. 1 showing the construction of an apparatus according to a first embodiment of the invention, numeral 1 designates an internal combustion engine, 2 an ignition device, 3 a rotational angle sensor integrated with a distributor, 4 an intake pipe positioned downstream of a throttle valve, and 5 the throttle valve linked with an accelerator pedal. Numeral 7 designates an air flow sensor so designed that the position of a deflector plate disposed in an air passage is varied in response to the amount of air flow and the output voltage is varied in accordance with the position of the deflector plate, thereby sensing the amount of air flow. Numeral 6 designates a downstream air inlet pipe connecting the air flow sensor 7 to the throttle valve portion, 9 an air cleaner, 8 an upstream air inlet pipe connecting the air cleaner 9 to the air flow sensor 7, and 10 a pressure sensor for sensing the pressure in the intake pipe. Numeral 11 designates a throttle sensor comprising a switch which is turned on and off in response to the position of the throttle valve 5. Numeral 14 designates an electromagnetic bypass air valve disposed to bypass the air flow sensor 7, and its characteristics are shown in FIG. 2. The electromagnetic bypass air valve 14 is designed so that, in accordance with the value of a current flowing therethrough, the amount of valve lift is varied and the valve opening area is varied linearly. When the valve opening area is maintained constant, the absolute value of the air flow varies depending on the magnitude of the difference pressure $A_1$, $A_2$ or $A_3$ ($A_3 > A_2 > A_1$) across the electromagnetic valve. If the difference pressure is constant, there is proportionality between the amount of the electromagnetic valve control current and the amount of air flow. Numeral 12 designates a downstream bypass inlet pipe connecting the electromagnetic bypass air valve 14 to the intake pipe 4, and 13 an upstream bypass inlet pipe connecting the electromagnetic bypass air valve 14 to the upstream air inlet pipe 8. Numeral 15 designates a computer comprising a microprocessor responsive to the outputs of the air flow sensor 7, the rotational angle sensor 3 and the throttle sensor 11 to detect the operating conditions of the engine, compute the current fuel injection quantity in terms of a pulse width and deliver a signal representing the pulse width to a fuel injection valve 16.

Instead of monitoring engine speed, engine output torque may be monitored as is well known in the art. It is possible to utilize various well-known and conventionally available techniques for measuring engine output torques or for obtaining values representative of the engine output torques.

In FIG. 3 showing a detailed construction of the computer 15, numeral 20 designates a central processing unit (CPU) responsive to the engine operating conditions to compute an optimum ignition timing and optimum air-fuel ratio. Numeral 26 designates a read-only memory (ROM) storing a control program and control constants, and 27 a random access memory unit (RAM) which is used when the CPU 20 is in operation in accordance with the control program. Numeral 25 designates a non-volatile RAM comprising a read/write memory for storing values indicative of learned optimum ignition timings and optimum air-fuel ratios, which differs from the RAM 27 in that the memory contents can be maintained even if the ignition key switch is turned off. In other words, the non-volatile RAM 25 includes a built-in simple auxiliary power supply such as a small battery. Alternatively, instead of using such an auxiliary power supply, the non-volatile RAM 25 may be fed by a vehicle-mounted battery directly but not via the ignition key switch, or the RAM 25 may be comprised of non-volatile memory elements.

A timer unit 22 comprises a counter for counting clock signals and a latch for storing and holding the value of the counter each time a rotational angle signal pulse is generated from the rotational angle sensor 3. With this construction, in response to the generation of the rotational angle pulse, the CPU 20 reads the value of a crank angle counter unit 23 to determine the rotational angle position of the engine and also reads the value in the latch of the timer unit 22. This operation is carried out at each of two rotational angle positions of the engine to obtain a difference between the two latch values, whereby it is made possible to measure the time of engine rotation between the two rotational angle positions and also to measure the engine rotational speed. The counter composing the crank angle counter unit 23 counts the rotational angle signal from the rotational angle sensor 3 and the rotational angle signals generated immediately after the generation of the top dead center signals for the No. 1 and No. 3 cylinders, respectively, (in the case of a four-cylinder engine) reset the count of the counter to zero, thereby keeping synchronization with the rotation of the engine. Thus, if the CPU 20 reads the count of the crank angle counter unit 23, it is possible to detect the rotational angle position of the engine.

A digital input port 24 is used to input and output a logical signal, and it receives a signal indicative of the condition of the throttle sensor 11 operatively associated with the throttle valve 5. In executing the program, the CPU 20 reads the content of the digital input port 24 to detect the condition of the throttle sensor 11, as occasion requires.

An analog input port unit 21 measures the voltage signal of analog signals, that is, the output voltage signal of the pressure sensor 10 for measuring the intake pipe pressure of the engine 1 and the output voltage signal of the air flow sensor 7 for measuring the amount of intake air into the engine 1 are subjected to A/D (analog-to-digital) conversion. The converted data are transferred via a common bus 31 in response to the demand from the CPU 20.

An ignition controller 28 generates an energization and ignition signal to be supplied to the ignition device 2, and it comprises a plurality of down counters.

A fuel injection controller 29 is designed so that a pulse signal having a pulse width corresponding to the fuel injection quantity computed by the CPU 20 is applied to the fuel injection valve 16 to open the fuel injection valve 16 intermittently. A bypass air flow controller 30 is responsive to a signal from the CPU 20 to control the value of a current flowing through the electromagnetic bypass air valve 14 thereby to vary the amount of bypass air flow.

FIGS. 4, 5, 6 and 7 are flow charts showing the details of the processing operations, namely, the program for the control of the ignition timing and air-fuel ratio optimization, of the computer 15. FIG. 8 is a time chart for explaining the operation of the computer 15. An explanation of the flow and time charts will now be made. When the operation of the engine 1 is started, the program is started by a step 101 and the counter (n) for counting the number of events of fuel injection is initialized to n=0. The fuel injection is effected at a predetermined crank angle once per revolution for a four-cylinder engine and the number of events of injection is counted to detect an integrated rotational speed.

A step 102 sets a bit "0" in a flag 1, and the next step 103 determines the state of the flag 1. If there is a bit "0" in the flag 1, the control is transferred to a step 104 in FIG. 4, and if there is a bit "1" in the flag 1, the control is transferred to a step 154 in FIG. 5. The step 104 inputs a rotational speed Ne, an intake air quantity Qa and an intake pipe pressure Pm by means of the rotational angle sensor 3, the air flow sensor 7 and the pressure sensor 10, respectively. A step 105 computes, from the rotational speed Ne and the intake air quantity Qa, a valve opening pulse width P of the fuel injection valve 16 taking aim at the attainment of the stoichiometric air-fuel ratio (about 15:1). A step 106 computes a basic ignition timing $\theta_B$ from the current rotational speed Ne and the current output of the pressure sensor 10. This basic ignition timing $\theta_B$ is stored in the form of a map in accordance with rotational speeds and intake pipe pressures in the non-volatile RAM 25 of the computer 15 which will not be described here in any detail since it is well known in the art. In accordance with the rotational speed Ne and the intake pipe pressure Pm, a step 107 reads a correction advance angle $\Delta\theta_p{}^r$ from another map which is different from the previously mentioned one. This map is provided in the non-volatile RAM 25 of the computer 15, and the values of $\Delta\theta_p{}^r$ are stored in accordance with the values of the rotational speed Ne and intake pipe pressure Pm which are divided at predetermined intervals, respectively.

The next step 108 computes an ignition timing $\theta$ by adding the correction advance angle $\Delta\theta_p{}^r$ to the basic ignition timing $\theta_B$. In accordance with the current rotational speed Ne and the current intake pipe pressure Pm detected by the pressure sensor 10, a step 109 reads from still another map in the non-volatile RAM 25 a current value $\Delta T_p{}^r$ of the electromagnetic bypass air valve 14 which corresponds to the amount of air flow bypassing the throttle valve 5. The non-volatile RAM 25 stores the values of $\Delta T_p{}^r$ in accordance with the values of the rotational speed Ne and the intake pipe pressure Pm which are divided at predetermined intervals, respectively. A step 110 computes a current value T which is to be applied to the electromagnetic valve 14.

A step 111 determines whether the throttle opening is zero (namely, the fully-closed throttle switch is on) in accordance with the signal from the throttle sensor 11. If the throttle valve 5 is in the fully-closed position, the control is branched to "YES" and transferred to a step 207 in FIG. 6, thus delivering a valve closing signal to the electromagnetic bypass air valve 14. Then, in FIG. 6, a step 208 multiplies the valve opening pulse width P of the fuel injection valve 16 computed by the step 105 by a correction factor $K_1$ to obtain an air-fuel ratio which ensures a stable idling operation, and a step 209 applies a pulse signal of a corrected pulse width Pi to the injection valve 16. A step 210 executes a computation ($\theta=\theta_B$) so that the ignition timing spark advance angle is set to the basic ignition timing, and a step 211 delivers the resultant ignition timing $\theta$. Then, the processing returns to the step 101. In other words, if the throttle valve is fully closed, no decision and correction steps for the minimum-fuel consumption ignition timing are executed.

If the step 111 determines that the throttle valve is not closed fully, the control is branched to "NO" and transferred to a step 112, where the ignition timing $\theta$ computed by the step 108 is delivered to the ignition device. Then, a step 113 delivers the final current value T computed by the step 110 to the electromagnetic bypass valve 14 and the next step 114 delivers to the fuel injection valve 16 the pulse signal of the pulse width P computed by the step 105. The next step 115 increases the number of events of injection n by 1, and a step 116 determines whether the number of events of injection has reached a preset number (4 in this embodiment). If the preset number has been reached, the control is branched to "YES" and transferred to a step 117 which in turn stores in the memory (the RAM 27) a count value $N_1$ of the rotational speed measuring clock pulses generated during the time period between N=0 and n=4, namely, the period of four ignition events. The processing circulates from the step 104 to the step 116 until the decision of the step 116 reaches n=4.

After the completion of the step 117, the control is transferred to a step 118 so that the steps 118 to 121 execute the same operations as the steps 104 to 107. A step 122 reads a dither amlitude $\Delta t$ (e.g., 2° to 3° crank angle) of the ignition timing, and a step 123 adds the required value $\Delta t$ computed by the step 122 to the ignition timing $\theta_B+\Delta\theta_p{}^R$ (namely, the latter is advanced by $\Delta t$) to compute an ignition timing $\theta$. Steps 124 and 125 perform the same operations as the steps 109 and 110, and a step 126 determines whether the throttle valve is in the fully-closed position. If the throttle valve is fully closed, the control is branched to "YES" and transferred to the previously mentioned step 207. If it is not, the control is branched to "NO" and transferred to a step 127, so that a control signal corresponding to the ignition timing $\theta$ which has been computed by the step 123 to be in advance of the desired ignition timing is generated and the ignition is effected at the ignition timing $\theta$ by the ignition device 2. Steps 128 to 130 execute the same operations as the steps 113 to 115, and a step 131 determines whether the number of ignition events has reached n=8. If it is not, the steps 118 to 131 are executed repeatedly until n=8 is reached. A step 132 stores in the memory (the RAM 27) a count value $N_2$ of the clock pulses for the four ignition events (n=5 to 8), and then the control is transferred to a step 133. The steps 133 to 144 execute the same oprations as the steps 104 to 115, and the processing circulates from the step 133 to the step 145 until n=12 is reached. When the step 145 determines that n=12, the control is branched to "YES", and a step 146 stores a count value $N_3$ of the clock pulses for the four ignition events (n=9 to 12) in the memory (the RAM 27).

Figure 9:
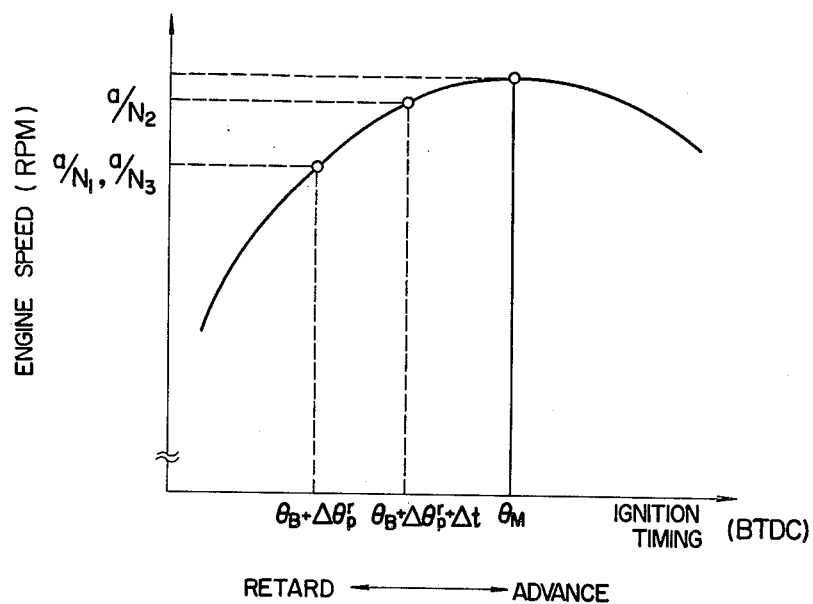
FIG. 9 is a diagram showing the relationship between the ignition timing and the engine rotational speed.

Then, the control is transferred to a step 147 which in turn compares the count values $N_1$, $N_2$ and $N_3$ which were counted by the steps 117, 132 and 146, respectively. For example, referring to FIG. 9, when the ignition timing $\theta_B + \Delta\theta_p^r$ is retarded or delayed from the ignition timing $\theta_M$ which provides the maximum engine power (torque) under the existing engine operating conditions and there is no change in the engine operating conditions, as in the case of the previously mentioned processing steps, if the ignition is effected first at the ignition timing $\theta_B + \Delta\theta_p^r$, the count value for four ignition events becomes $N_1$ and the rotational speed (rpm) becomes $a/N_1$ (where a is a constant). Then, if the ignition is effected at the ignition timing $\theta_B + \Delta\theta_p^r + \Delta t$ which is in advance of $\theta_B + \Delta\theta_p^r$, the count value is $N_2$ and the rotational speed becomes $a/N_2$. Then, when the ignition is effected again at the ignition timing $\theta_B + \Delta\theta_p^r$, the count value is $N_3$ and the rotational speed becomes $a/N_3$. If the engine operating conditions are constant, the speeds $a/N_1$ and $a/N_3$ are equal to each other as shown in FIG. 9. A comparison of the rotational speeds shows that $a/N_2 > a/N_1$, $a/N_3$, or $N_2 < N_1$, $N_3$. Then, if the relationship $N_2 < N_1$, $N_3$ holds, this is determined by a step 147 and the control is transferred to a step 149 which in turn adds a correction value $\Delta\theta$ (e.g., 1° to 2° crank angle) to the correction advance angle $\Delta\theta_p^r$. In other words, the correction advance angle is increased so that the ignition timing $\theta_B + \Delta\theta_p^r$ is corrected in a direction of advance and the ignition timing is brought near to the optimum ignition timing $\theta_M$ which provides the maximum engine power.

On the contrary, if the relationship $N_2 < N_1$, $N_3$ does not hold, the control is transferred to a step 148. If, for example, the ignition timing $\theta_B + \Delta\theta_p^r$ is in advance of the optimum ignition timing $\theta_M$ which provides the maximum engine power and also there is no change in the engine operating conditions, the rotational speeds become $a/N_2 < a/N_1$, $a/N_3$, or $N_2 > N_1$, $N_3$ contrary to the case of FIG. 9. Then, if the relationship $N_2 > N_1$, $N_3$ holds, this is determined by the step 148 and the control is transferred to a step 150 and the correction value $\Delta\theta$ is subtracted from the correction advance angle $\Delta\theta_p^r$. In other words, the correction advance angle is decreased so that the ignition timing $\theta_B + \Delta\theta_p^r$ is corrected in a direction of retardation and the ignition timing is brought near to the optimum ignition timing $\theta_M$ which provides the maximum engine power. If neither the relationship $N_2 < N_1$, $N_3$ nor $N_2 > N_1$, $N_3$ holds, the control proceeds to a step 151, and the correction advance angle $\Delta\theta_p^r$ is not corrected. In other words, if the engine operating conditions change during a transitional period of the engine, that is, for example, when during the accelerating operation of the engine, the engine is operated firstly at the ignition timing $\theta_B + \Delta\theta_p^r$, then at an ignition timing in advance of the ignition timing $\theta_B + \Delta\theta_p^r$ by $\Delta t$, and then again at the ignition timing $\theta_B + \Delta\theta_p^r$, irrespective of the relative position of the current ignition timing and the optimum ignition timing $\theta_M$, the rotational speed of the engine successively increases and thus there results a relationship $a/N_1 < a/N_2 < a/N_3$ or $N_1 > N_2 > N_3$. Thus, none of the deciding conditions of the steps 147 and 148 holds and the correction advance angle $\Delta\theta_p^r$, consequently, that of the ignition timing $\theta_B + \Delta\theta_p^r$, is not effected. In the similar way, during the deceleration period of the engine the correction of the correction advance angle $\Delta\theta_p^r$ is not effected.

After the step 149, 150 or 151 has been completed, the control is transferred to a step 152 which in turn inverts the flag 1 which was set to "0" by the step 102. The next step 153 resets the counter (n) to zero. This tentatively completes the ignition timing optimizing control (i.e., one cycle of the ignition timing optimization processing in the present embodiment). With the ignition timing corrected in this way it is now ready to perform the air-fuel ratio optimizing control (i.e., the control of the bypass air flow in this embodiment).

After the counter (n) has been initialized at the step 153, the control is returned to the step 103. Since the flag 1 has been set to "1" by the step 153, the control is transferred to a step 154. The steps 154 to 159 execute the same operations as the previously mentioned steps 104 to 109. A step 160 causes the throttle switch 11 to determine whether the throttle valve opening is greater than 60% (i.e., the wide-open throttle switch is on). If the throttle valve opening is greater than 60%, the control is branched to "YES" and transferred to a step 212 in FIG. 7, thus delivering an electromagnetic valve closing output to the electromagnetic bypass air valve 14. In a step 213 the pulse width P computed by the step 155 is multiplied by a correction factor $K_2$ to obtain an output air-fuel ratio (about 13:1) and the reusltant pulse width $P_W$ is applied to the injection valve 16 at a step 214. A step 215 delivers the ignition timing $\theta$ computed by the step 158 to the ignition device 2. In other words, when the throttle valve opening is greater than 60%, no decision and correction operations are executed to obtain the optimum air-fuel ratio for minimum fuel consumption.

If the step 160 determines that the throttle valve opening is less than 60%, the control is branched to "NO" and a step 161 determines whether the throttle valve opening is zero (or the throttle valve is closed fully). If the throttle valve is in the fully-closed position (or the fully closed switch is on), the control is transferred to the step 207 so that the steps 208, 209, 210 and 211 are executed successively and then the control is returned to the step 101. If the throttle valve is not fully closed, the control is transferred to a step 162 where the electromagnetic valve correcting current $\Delta T_p^r$ obtained by the step 159, which current corresponds to the current engine rotational speed Ne and intake pipe pressure Pm, is selected as an electromagnetic valve energizing current T, and a step 163 delivers the ignition timing $\theta$ computed by the step 158 from the engine operating conditions thereby to operate the engine. A step 164 delivers the electromagnetic valve energizing current T to the electromagnetic valve 14 and the opening area of the electromagnetic valve 14 is varied to pass a desired amount of bypass air.

Then, a step 165 delivers a pulse signal of the pulse width P computed by the step 155 to the injection valve 16. A step 166 increases the number of injection events or the counter (n) by 1 and a step 167 determines whether the number of injection events has reached a preset number (4 in this embodiment). Thus, the processing circulates from the step 154 to the step 167 until n=4 is reached. When n=4 is reached, the control is branched to "YES" and proceeds to a step 168 where a count value $N_A$ of the clock pulses generated during the period between n=0 and n=4 or the period of four injection events (four ignition events) is stored in the memory (the RAM 27). After the completion of the step 168, the control proceeds to a step 169, and the steps 169 to 176 execute the same operations as the previously mentioned steps 154 to 161. If the step 176 determines that the throttle valve is not fully closed, the control is branched to "NO" and proceeds to a step 177 which reads a current valve $t_L$ for increasing the amount of valve lift of the electromagnetic valve 14 by a predetermined value, and then a step 178 adds the predetermined current value $t_L$ read by the step 177 to the correction current $\Delta T_p{}^r$ to obtain an energizing current T. A step 179 operates the engine at the ignition timing computed by the step 173 and a step 180 delivers the energizing current T computed by the step 178 to the electromagnetic valve 14. Thus, if the engine is in the steady operating condition, there flows bypass air of an amount which is greater than that of bypass air supplied by the energizing current $T=\Delta T_p{}^r$ by a predetermined amount. Then, a step 182 increases the value of the counter (n) by 1. The processing circulates from the step 169 to the step 183 until n reaches 8. When n=8 is reached, the control is branched to "YES" and proceeds to a step 184 where a count value $N_B$ (the rotational period) of clock pulses for the four ignition events is stored in the memory, and then the control proceeds to a step 185.

Figure 10:
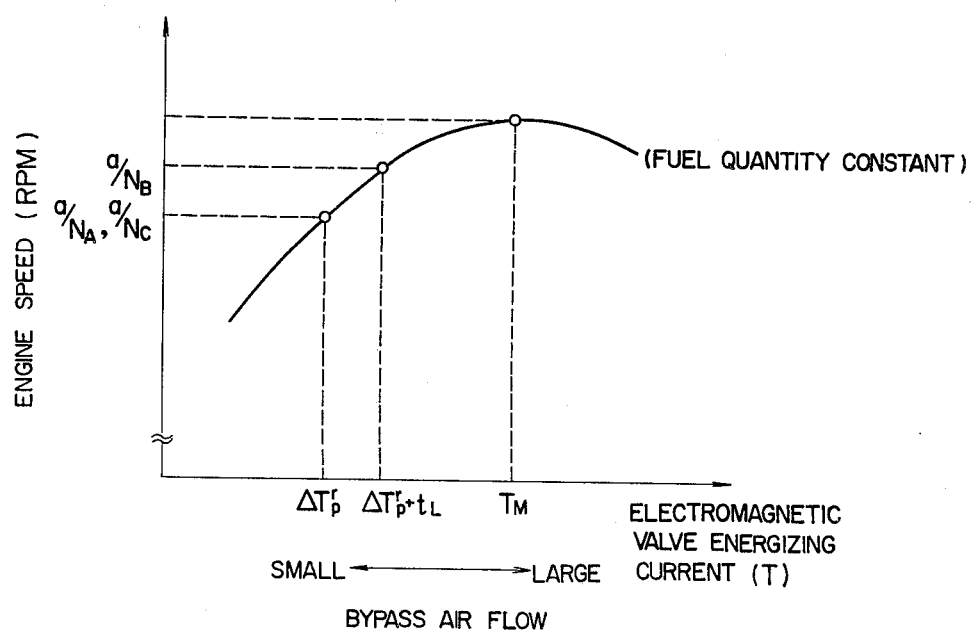
FIG. 10 is a diagram showing the relationship between the electromagnetic valve energizing current and the engine rotational speed.

The steps 185 to 197 execute the same operations as the previously mentioned steps 154 to 166, and the processing circulates from the step 185 to the step 198 until the step 198 decides that n=12. When the step 198 decides that n=12 has been reached, the control is branched to "YES", and a step 199 stores a count value $N_C$ of clock pulses for the four ignition events (n=9 to 12) in the memory. Then, the control proceeds to a step 200 where a comparison is made among the count values $N_A$, $N_B$ and $N_C$ which were respectively obtained by the steps 168, 184 and 199. For example, referring to FIG. 10, when the amount of bypass air flow supplied by the energizing current $\Delta T_p{}^r$ is less than that supplied by the optimum current value $T_M$ which provides the maximun engine power (torque) under the existing engine operating conditions and there is no change in the engine operating conditions, as in the case of the previously mentioned processing steps, if the engine is operated firstly by applying the current $\Delta T_p{}^r$ to the electromagnetic valve 14 to supply bypass air, the count value for the four ignition events become $N_A$ and the rotational speed (rpm) becomes $a/N_A$ (where a is a constant. Then, if the engine is operated by supplying the energizing current $T=\Delta T_p{}^r+t_L$, which is greater than the current $\Delta T_p{}^r$ by the predetermined value $t_L$, to supply an increased amount of bypass air, the count value becomes $N_B$ and the rotational speed becomes $a/N_B$. If the engine is operated by supplying again the current $\Delta T_p{}^r$ to the electromagnetic valve 14, the count value becomes $N_C$ and the rotational speed becomes $a/N_C$. Thus, if the engine operating conditions are constant, the rotational speeds $a/N_A$ and $a/N_C$ become equal to each other, as seen from FIG. 10. In this case, a comparison among the rotational speeds results in $a/N_B > a/N_A$, $a/N_C$ or $N_B < N_A$, $N_C$. Thus, if the relationship $N_B > N_A$, $N_C$ holds, this is determined by a step 200, and then the control proceeds to a step 202 where a correction value $\Delta T$ is added to the correction current $\Delta T_p{}^r$. In other words, the correction current is increased such that the current $\Delta T_p{}^r$ comes near to a current value which provides the optimum bypass air flow for ensuring the maximum engine power. On the other hand, if the relationship $N_B < N_A$, $N_C$ does not hold, the control proceeds to a step 201. For instance, when the current value is greater than that which provides the optimum bypass air flow for ensuring the maximum engine power and besides there is no change in the engine operating conditions, there holds a relationship $a/N_B < a/N_A$, $a/N_C$, or $N_B > N_A$, $N_C$ which is contrary to the case shown in FIG. 10. In other words, if the relationship $N_B > N_A$, $N_C$ holds, this is decided by the step 201 and the control proceeds to a step 203 where the correction value $\Delta T$ is subtracted from the correction current $\Delta T_p{}^r$. In other words, the correction current is decreased so that the current T comes near to the current value which provides the optimum bypass air flow for ensuring the maximum engine power. When neither the relationship $N_B < N_A$, $N_C$ nor the relationship $N_B > N_A$, $N_C$ holds, the control proceeds to a step 204, and the correction current $\Delta T_p{}^r$ is not corrected.

In other words, during a transitional period of the engine in which the engine operating conditions change, such as, during the accelerating operation of the engine, if the engine is operated sequentially firstly by supplying the current $\Delta T_p{}^r$ to the electromagnetic valve 14, then by supplying to the electromagnetic valve 14 a current having a value greater than the current $\Delta T_p{}^r$ by the predetermined value $t_L$, and then by supplying again the current $\Delta T_p{}^r$ to the electromagnetic valve 14, despite that the engine is operated by varying the electromagnetic valve energizing current T to become greater and smaller than the optimum current value $T_M$, the rotational speed is increased successively and there results a relationship $a/N_A < a/N_B < a/N_C$, or $N_A > N_B > N_C$. Thus, none of the decision conditions of the steps 200 and 201 holds, and the correction current $\Delta T_p{}^r$ is not corrected. In the similar way, the correction current $\Delta T_p{}^r$ is not correct during the decelerating operation of the engine.

After the completion of the step 202, 203 or 204, the flag 1 is inverted at a step 205. In this case, the bit "1", to which the flag 1 was set, is inverted to "0". The next step 206 resets the counter (n) to zero, thus completing the air-fuel ratio optimizing control (i.e., one cycle of the air-fuel ratio optimization processing in this embodiment). Then, the control returns to the step 103, and the state of the flag 1 is decided. Since the flag 1 has been set to "0" at the step 205, the control proceeds from the step 103 to the step 104, and the previously mentioned steps are repeatedly executed.

By virtue of the above-mentioned optimizing controls, if the engine is in the steady operating conditions and its ignition timing and air-fuel ratio deviate respectively from the ignition timing and air-fuel ratio for minimum fuel consumption, they can be controlled accurately at the ignition timing and air-fuel ratio for minimum fuel consumption.

FIG. 8 is a time chart showing the optimizing controls according to the above-described enbodiment. When the ignition timing $\theta$ is shown in (2) of FIG. 8 or the amount of bypass air flow, namely, the air-fuel ratio (A/F) shown in (3) or (4) of FIG. 8, respectively, is varied alternately at every four ignition events as shown in (6) of FIG. 8, the engine rotational speed varies as shown in (1) of FIG. 8, and this rotational speed is counted in terms of the number of clock pulses shown in (5) of FIG. 8, whereby it is made possible to detect the direction of deviation from the ignition timing and air-fuel ratio for minimum fuel consumption.

Figure 12:
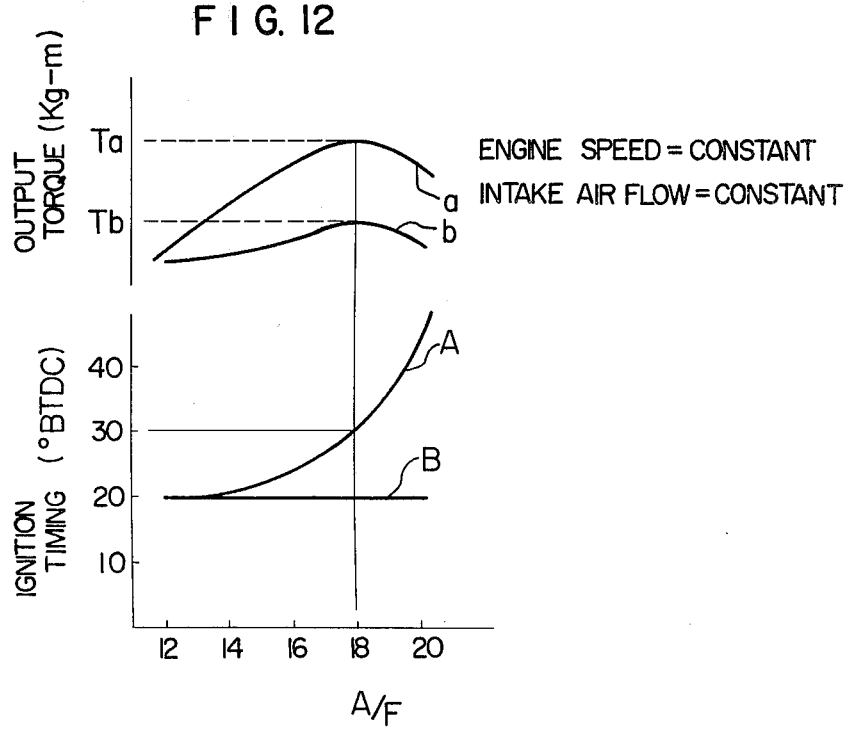
FIG. 12 is a diagram showing the relationship of the ignition timing and output torque versus the air-fuel ratio.

FIG. 12 is a characteristic diagram showing the relationship of the ignition timing and output torque versus the air-fuel ratio (A/F) when the rotational speed and the intake air flow into the engine are maintained constant. In FIG. 12, symbol A designates a performance curve showing the optimum ignition timings at various air-fuel ratios, a the output torques at various air-fuel ratios and with the ignition timing changed along the curve A, and b the output torques obtained by varying the air-fuel ratio and with the ignition timing maintained constant at 20° before the top dead center as shown at B in the Figure. In FIG. 12, symbol Ta shows an output torque obtained with each of the air-fuel ratio and the ignition timing being held at the optimum value, and Tb an output torque obtained by holding the air-fuel ratio at the optimum value but making no correction of the ignition timing. As seen from FIG. 12, when the air-fuel ratio is controlled at the air-fuel ratio for minimum fuel consumption, it is important to correct the ignition timing in response to the change of the air-fuel ratio instead of maintaining the ignition timing constant.

In the above-described first embodiment, the air-fuel ratio is optimized by dithering the amount of bypass air flow, deciding a direction, in which the fuel consumption is improved, from the change of the rotational speed synchronized with the dithering and correcting the air-fuel ratio by changing the value of the current applied to the electromagnetic bypass air valve 14 thereby to change the amount of bypass air flow. However, in a second embodiment of the invention whose time chart is shown in FIG. 11, after the amount of air flow has been dithered to decide a direction in which the fuel consumption is improved, the correction of the air-fuel ratio is effected by correcting the pulse width of a valve opening pulse for the fuel injection valve 16 instead of changing the amount of bypass air flow. Namely, referring to FIG. 11, after the amount of by-pass air flow has been changed to decide a direction, in which the fuel consumption is improved, as shown in (4) of FIG. 11, the actual correction of the air-fuel ratio (A/F) shown in (3) of FIG. 11 is effected by correcting the pulse width P of the fuel injection vlave opening pulse shown in (5) of FIG. 11. However, the optimization of the ignition timing shown in (2) of FIG. 11 is effected in the same manner as the first embodiment. In FIG. 11, (1) shows the variation of the rotational speed, (6) the clock pulses, and (7) the number of ignition events. The construction and processing, excepting the above-mentioned difference, of the second embodiment are identical with those of the first embodiment.

While, in the above-described embodiments, the ignition timing optimization processing and the air-fuel ratio optimization processing are executed alternately at every same number of ignition events, the number of ignition events for the ignition timing optimization processing may differ from that for the air-fuel ratio optimization processing, and further each of the two kinds of processings may be executed a plurality of times continuously.

Further, upon comparison between the variation of the rotational speed caused by the dithering of the ignition timing and that caused by the dithering of the air-fuel ratio, either one of the processings giving rise to a greater amplitude of variation may be executed continuously and the other processings may be executed when both amplitues of variation become equal to each other or the relation of the amplitude of variation is reversed.

Further, while the above-described embodiments use the bypass air controlling electromagnetic valve 14 of a linear solenoid type which controls the displacement of its shaft, the same control can be accomplished by using a butterfly valve of the type whose degree of opening can be detected or a stepping motor type electromagnetic valve.

Further, while, in the above-described embodiments, the pressure sensor 10 is used to detect the intake pipe pressure, the intake air quantity Qa and the rotational speed Ne may be utilized to replace the intake pipe pressure by Qa/Ne, or alternatively the intake pipe pressure may be replaced by the throttle valve opening.

It will thus be seen from the foregoing description that since, in accordance with the present invention, the ignition timing optimizing control comprising at least one cycle of optimization processing for controlling the ignition timing at its optimum value and the air-fuel ratio optimizing control comprising at least one cycle of optimization processing for controlling the air-fuel ratio at its optimum value are effected alternately, a great advantage is brought such that the engine can be controlled accurately at the desired ignition timing and air-fuel ratio for minimum fuel consumption, without being affected by any external factor such as the operation of an accelerator pedal.

We claim:

1. A method for optimum control for internal combustion engines using memory means preliminarily storing, in the form of maps, values of ignition timing and air-fuel ratio as control variables of an internal combustion engine in accordance with parameters indicative of operating conditions of said engine and alternately performing an ignition timing optimizing control and an air-fuel ratio optimizing control, wherein:

said ignition optimizing control executing at least one cycle of an ignition timing optimization processing comprising:

operating said engine, with the value of air-fuel ratio being maintained constant at a value stored in the map, at at least two ignition timings including one of said stored values of ignition timing for a predetermined time period, detecting signals indicative of one of engine rotational speed and engine output torque resulting from the operations of said engine at said at least two ignition timings, respectively, comparing with one another said detection signals resulting from the operations of said engine over at least three successive ones of said predetermined time periods among said detection signals resulting from the operations of said engine at said at least two ignition timings, deciding from the result of the comparison a direction of correction in which the rate of fuel consumption of saidengine is to be improved, and correcting in said direction said one of said stored values of ignition timing; and said air-fuel ratio optimizing control executing at least one cycle of an air-fuel ratio optimization processing comprising:
operating said engine, with the value of ignition timing being maintained constant at a value stored in the map, at at least two air-fuel ratios including one of said stored values of air-fuel ratio for a predetermined time period,
detecting signals indicative of one of engine rotational speed and engine output torque resulting from the operations of said engine at said at least two air-fuel ratios, respectively,
comparing with one another said detection signals resulting from the operations of said engine over at least three successive ones of said predetermined time periods among said detection signals resulting from the operations of said engine at said at least two air-fuel ratios,
deciding from the result of the comparison a direction of correction in which the rate of fuel consumption of said engine is to be improved, and
correcting in said direction said one of said stored values of air-fuel ratio.

2. A method according to claim 1 comprising the steps of:
operating said engine, with the value of one of the ignition timing and the air-fuel ratio as the control variables of said engine being maintained constant at a value stored in the map thereof, and over three successive predetermined time periods during the first and third ones of which the value of the other one of the control variables is maintained at a value stored in the map thereof and during the second one of which the value of the other one of the control variables is dithered;
counting clock pulses occurring during the respective three successive predetermined time periods;
comparing with one another among two count values of the clock pulses occurring during the first and third predetermined time periods and a count value of the clock pulses occurring during the second predetermined time period; and
deciding from the relative magnitude of said three count values a direction in which the value of the other one of the control variables stored in the map thereof is to be corrected so as to improve the rate of fuel consumption of said engine.

3. A method according to claim 1, wherein none of said ignition timing and air-fuel ratio optimizing controls is effected when it is decided that a throttle valve of said engine is fully closed, and wherein said air-fuel ratio optimizing control is not effected when it is decided that the opening of said throttle valve is greater than a predetermined large magnitude.

4. A method according to claim 1 or 2, wherein the actual correction of the air-fuel ratio in said air-fuel ratio optimizing control is effected by controlling an energizing current applied to an electromagnetic bypass air valve bypassing an air flow sensor and a throttle valve which are disposed in an air intake system of said engine.

5. A method according to claim 1 or 2, wherein the actual correction of the air-fuel ratio in said air-fuel ratio optimizing control is effected by correcting a pulse width of a valve opening pulse applied to fuel injection valve means of said engine.

6. A method according to claim 1 or 2 comprising the steps of:
effecting once each of said ignition timing and air-fuel ratio optimization processings;
then continuing the optimization processing of one of said control variables in which there has occurred a greater difference between the compared count values of the clock pulses than that in the optimization processing of the other one of said control variables; and
then effecting the optimization processing of the other one of said control variables when the difference between the compared count values has become equal to each other or the relative magnitude of the difference between the compared count values has reversed between both optimization processings.

7. An apparatus for optimum control for internal combustion engines for atlernately effecting optimizing controls of the ignition timing and air-fuel ratio as control variables of an internal combustion engine in response to signals generated by sensor means for sensing parameters indicative of operating conditions of said engine thereby to accomplish the optimum control of said engine, wherein:
said sensor means include a rotational angle sensor for generating a signal indicative of a rotational angle of said engine, a pressure sensor for sensing pressure in an intake pipe of said engine, an air flow sensor for sensing an amount of air flow into said engine, and a throttle sensor for sensing an opening of a throttle valve of said engine; and
said apparatus further comprises:
an electromagnetic bypass air valve arranged to bypass said air flow sensor and said throttle valve which are disposed in an air intake system of said engine; and
computing means having memory means preliminarily storing values of the ignition timing and air-fuel ratio of said engine and responsive to detection signals generated by said sensor means to effect computational operations and deliver output drive signals to ignition means, said electromagnetic bypass air valve and fuel injection valve means of said engine, thereby alternately effecting an operation of correcting, while maintaining the air-fuel ratio of said engine constant, a value of the ignition timing stored in said memory means in a direction to improve the rate of fuel consumption of said engine and an operation of correcting, while maintaining the ignition timing of said engine constant, a value of the air-fuel ratio stored in said memory means in a direction to improve the rate of fuel consumption of said engine.

8. An apparatus according to claim 7, wherein said computing means comprises:
a central processing unit;
input means for receiving the detection signals generated by said sensor means;
timer means including a counter for counting clock signals and a latch responsive to a rotational angle signal from said rotational angle sensor to latch a count value of said counter upon arrival of said rotational angle signal;
energization and ignition control means for generating a signal to drive said ignition means;
bypass air flow control means for generating a signal to drive said electromagnetic bypass air valve; and
fuel injection quantity control means for generating a signal to drive said fuel injection valve means, and said memory means includes:

read-only memory means storing a control program and control constants;

random-access memory means used for general read/write purposes while said computing means is in operation; and non-volatile read/write memory means for storing values indicative of learned optimum ignition timings and optimum air-fuel ratios.

* * * * *